April 5, 1960

C. H. WHITTIER 2,931,333

DIALS

Filed May 9, 1958

2 Sheets-Sheet 1

INVENTOR.
Carl H. Whittier
BY
Emery, Whittemore, Sanders & Cox
ATTORNEYS.

April 5, 1960  C. H. WHITTIER  2,931,333
DIALS

Filed May 9, 1958  2 Sheets-Sheet 2

INVENTOR.
Carl H Whittier
BY
Emery, Whittemore, Sandoe & Dey
ATTORNEYS.

United States Patent Office 2,931,333
Patented Apr. 5, 1960

2,931,333

DIALS

Carl H. Whittier, Sharon, Mass., assignor to General Communication Company, Boston, Mass., a corporation of Massachusetts Application May 9, 1958, Serial No. 734,188

5 Claims. (Cl. 116—129)

This invention relates to dials, and pertains particularly to a dial having means for introducing a correction into the dial reading.

There are many types and styles of dials. In some cases the dial comprises a movable scale element such as a disk which moves with respect to a stationary index element such as a line or pointer. In other cases the dial comprises a movable index element which moves with respect to a fixed scale element. If the movable element of the dial is suitably connected to a movable element of an instrument or mechanism which controls or is controlled by the dial, the dial will indicate motion or mechanical position thereof.

Accuracy, good resolution and ease of reading are prime requisites of good dials, all of which have been achieved with varying degrees of success by expedients known in the art. In many cases, in addition, it is desirable to introduce a correction into a dial reading, but this problem has not been satisfactorily solved. Resort has been had to auxiliary correction tables, correction curves and the like, and in some cases complicated mechanical or electrical correction devices have been used.

It is an object of the present invention to provide a dial having a high degree of accuracy, high resolving power, and having a very simple correction device incorporated therein by means of which various types of corrections may be easily and quickly introduced into the dial reading.

Other objects and advantages of the invention will appear hereinafter.

Figure 2:
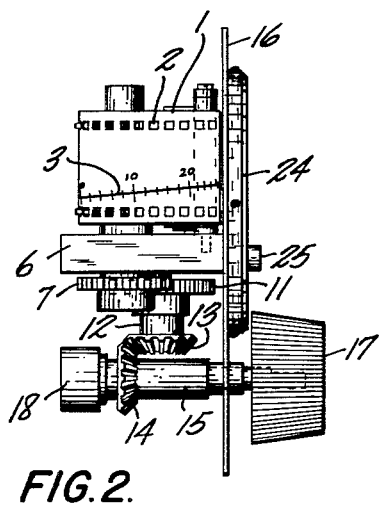
Figure 1:
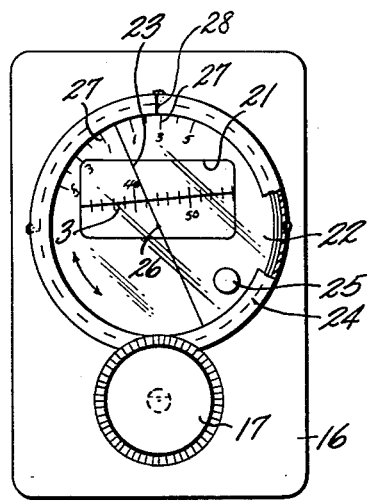
Figure 5:
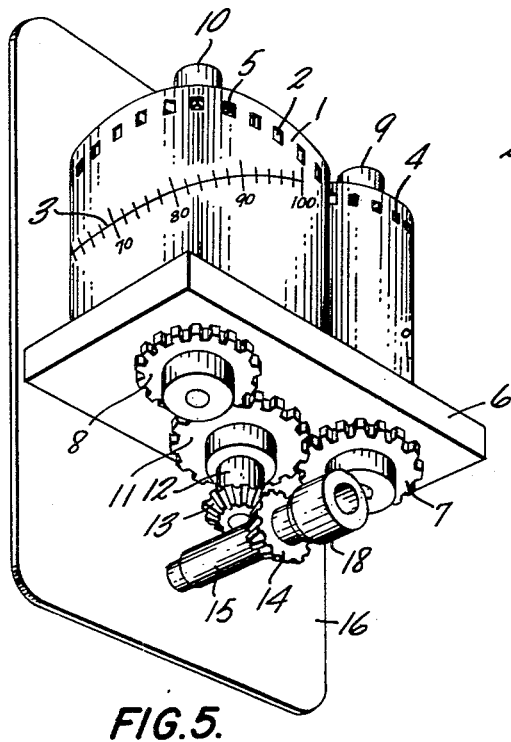
Figure 3:
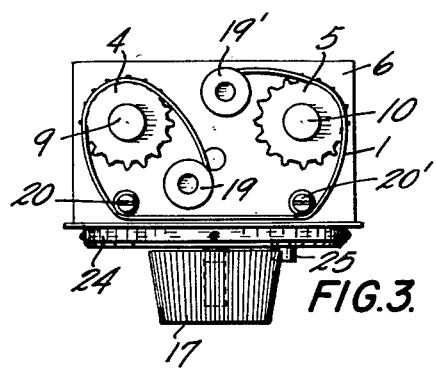
Figure 4:
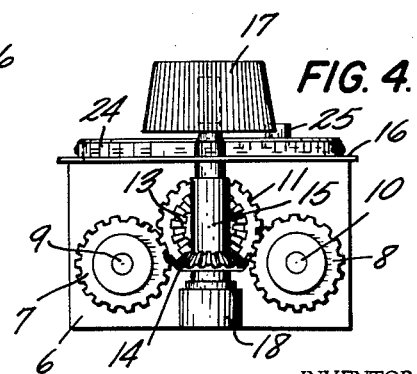
Figure 6:
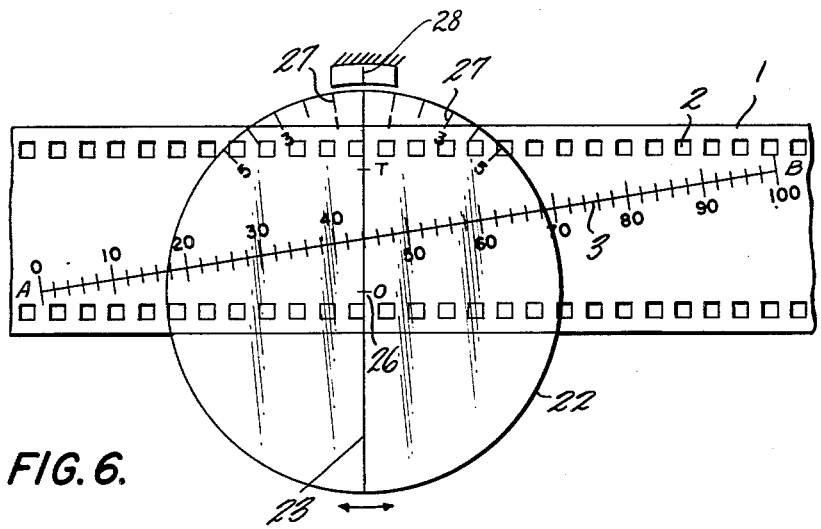
Figure 7:
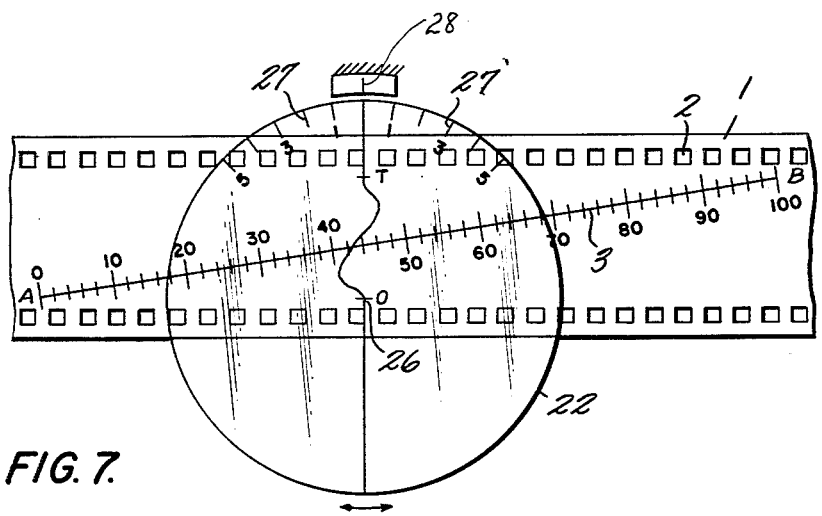

A preferred embodiment of the invention selected for purposes of illustration is shown in the accompanying drawings, in which:

Figure 1 is a front elevation, partly broken away.
Figure 2 is a side elevation.
Figure 3 is a top plan view.
Figure 4 is a bottom plan view.
Figure 5 is a perspective view.
Figure 6 is a semi-diagrammatic view illustrating the operation of the device.
Figure 7 is a similar view showing a modified form of endex line.

According to the present invention, the scale element comprises a length of flexible tape. The tape may be of any suitable material, but is preferably made of stainless steel, having rows of sprocket perforations 2 near its edges similar to the sprocket perforations of ordinary 35 mm. motion picture film. The tape may be of any desired length as required to provide the deisred resolution, and the scale line 3 may be inscribed thereon in any suitable manner as by printing, engraving, etching or the like.

Means are provided for moving the tape lengthwise with at least a portion of its length extending in a straight stretch past an observation point where the scale may be read. Thus, as shown in Figs. 1 to 5 of the drawings, the tape 1 may be mounted on a pair of feed sprockets 4 and 5 rotatably mounted on spaced parallel axes on a base plate 6. The said sprockets are interconnected to rotate in unison by means of gears 7 and 8 connected to sprocket shafts 9 and 10, respectively, and an intermediate gear 11 which meshes with the gears 7 and 8. Gear 11 is mounted on shaft 12 which also carries a bevel gear 13 which engages bevel gear 14 on shaft 15. One end of the shaft 15 extends through the front plate 16, which is mounted on the base plate 6, and carries an adjusting knob 17 by means of which the dial may be adjusted to any desired position. The other end of shaft 15 carries a fitting 18 adapted to receive the end of a flexible shaft or other suitable connection to a movable element of an instrument or mechanism to which the dial is to be connected.

If desired, gears (not shown) may be interposed in the connection between the fitting 18 and the movable element of the instrument or mechanism to which the dial is to be connected, said gears being of a ratio calculated to properly correlate the shaft revolutions with the length of the tape and the scale inscribed thereon. By proper selection of gear ratios it is possible to expand the tape to any reasonable length to obtain the desired degree of resolution.

The ends of the tape 1 may be wound around storage spindles 19 and 19' mounted on the plate 6. With the use of metal tape having a permanent curl incorporated therein, the tape will wind on and unwind from the spindles as it is moved by the sprockets without need to drive the storage spindles. Idler rolls 20, 20' are provided to guide the tape as it is moved by the sprockets to form a straight stretch which extends past an observation point where the scale may be read.

The front plate 16, suitably secured to the base plate 6, is provided with a window 21 through which the scale 3 may be read, and in front of the widow is a transparent index disk 22 having an index line 23 inscribed thereon, in any suitable manner, as by printing, engraving, etching or the like. The disk 22 is circular in shape and is mounted concentrically within a circular frame 24 which is secured to the front plate 16. The disk 22 is free to rotate inside the frame 24 and is provided with a knob 25 by which it may be manipulated to cause it to rotate about the axis 26. The disk lies in a plane parallel to the plane of the straight stretch of the tape, and its axis of rotation is perpendicular to the plane of the straight stretch of the tape.

Along he periphery of the transparent disk is also inscribed a correction scale 27, preferably extending circumferentially in both directions from the index line 26. An index set or "zero" point 28 is inscribed on the frame 24 directly above the axis 26.

The axis of rotation 26 of the index disk 22 is located to coincide with a point on the scale line 3 or an extension thereof where zero correction occurs. This may be understood with reference to the diagram Fig. 6, in which the tape is illustrated as extending in a plane parallel to the plane of the index disk. The scale line 3 is inscribed at an angle to the edge of the tape and points A and B indicate the extremities of the scale. The scale line 3 will intersect the index line 23 at a given point depending on the position of the scale and on the position of the index disk 22. As the tape is moved to the right or to the left with respect to the index line 23, the point of intersection will shift. Moreover, as the index disk 22 is rotated, the point of intersection will shift except when the point of zero correction on the scale 3, i.e. the point A as shown in the diagram, coincides with the center of rotation of the index disk 22. Under those conditions, the point of intersection will not change when the disk 22 is rotated.

The manner in which corrections may be introduced easily and quickly may now be explained with reference to a specific example. Let it be assumed, for example, that the dial is connected to the controls of a piece of electronic equipment in which it is necessary to introduce a temperature correction to compensate for an observed temperature condition. Let it be assumed, further, that the correction scale 27 represents units of temperature, and that the units indicated to the right of the index line 23 are positive or plus units, while the units indicated to the left of the index line 23 are negative or minus units. Now, let it be further assumed that it is desired to make a correction for 2.75 plus units of temperature. The disk is then rotated counter-clockwise until, as shown in Fig. 1, the proper indication of the correction scale is aligned with the index set point 28 on the frame 24. The knob 17 is then turned until the desired reading of the scale 3 intersects the index line 23, at which point the electronic equipment will be properly adjusted to compensate for the observed temperature condition.

It will be noted that the amount of the correction will depend on the setting of the scale 3. That is, if the knob 17 is turned to cause the scale 3 to intersect the index line 23 at point A, the correction will be zero. But as the scale is moved to the left, as shown in Fig. 1, the amount of the correction increases until the scale 3 intersects the index line 23 at point B.

In the drawings, the scale 3 is shown as a straight line, but curved scale lines may be used to accommodate varying curve functions. Likewise, the index line 23 may be a curved line or may be a random line as shown in Fig. 7 to compensate for random or sporadic errors.

If desired, the frame 24 may be mounted for vertical adjustment on the plate 16 in order that the center of rotation 26 of the disk 22 may be adjusted to coincide with the point on the scale line 3 or an extension thereof where zero correction occurs. In cases where the point on the scale line where zero correction occurs falls on an extension of said line which is beyond or outside the tape, such extension is to be deemed a part of the scale line for purposes of this invention.

It will be understood that the invention may be variously modified and embodied within the scope of the subjoined claims.

I claim as my invention:

1. A dial comprising a length of tape having a scale line inscribed on one face thereof, means for moving said tape lengthwise with at least a portion of its length extending in a straight stretch past an observation point where the scale may be read, and a transparent disk lying in a plane in front of and parallel to said straight stretch and mounted for rotation on an axis perpendicular to said straight stretch, said disk having an index line inscribed thereon which intersects the scale line inscribed on the tape, said disk being adjustable by rotation on its axis to change the point of intersection of the index line with the scale line and thereby introduce a correction in the dial reading.

2. A dial as claimed in claim 1 in which the scale line on said tape is inclined with respect to the edges of the tape, and in which the axis of rotation of said disk coincides with a single point on said scale line.

3. A dial as claimed in claim 1 in which the scale line on said tape is inclined with respect to the edges of the tape, and in which the axis of rotation of said disk coincides with the point on the scale line where zero correction occurs.

4. A dial as claimed in claim 1 in which said disk has a correction scale inscribed thereon extending around a portion of the periphery of said disk.

5. A dial as claimed in claim 1 in which said tape is provided with rows of perforations along its edges, and in which the means for moving said tape lengthwise comprises a pair of spaced sprockets which engage said rows of perforations, and means for rotating said sprockets in unison including a shaft having an operating knob on one end and a fitting on the other end for connection to a movable element of a mechanism which controls or is controlled by the dial.

References Cited in the file of this patent

UNITED STATES PATENTS

| | | |
|---|---|---|
| 1,935,970 | Wooster | Nov. 21, 1933 |
| 2,696,610 | Turley | Dec. 7, 1954 |
| 2,750,917 | Milligan | June 19, 1956 |

FOREIGN PATENTS

| | | |
|---|---|---|
| 664,177 | France | Aug. 30, 1929 |
| 353,572 | Great Britain | July 30, 1931 |
| 411,713 | Great Britain | June 14, 1934 |